United States Patent
Zou et al.

[19]

[11] Patent Number: 5,812,428
[45] Date of Patent: Sep. 22, 1998

[54] PROCESS CONTROLLER HAVING NON-INTEGRATING CONTROL FUNCTION AND ADAPTIVE BIAS

[75] Inventors: Hehong Zou, Plymouth; Coy L. Hays, Chanhassen, both of Minn.

[73] Assignee: Rosemount Inc., Eden Prairie, Minn.

[21] Appl. No.: 853,809

[22] Filed: May 9, 1997

Related U.S. Application Data

[63] Continuation of Ser. No. 532,488, Sep. 22, 1995, abandoned.

[51] Int. Cl.$^6$ .................................................. G05B 13/04
[52] U.S. Cl. .................... 364/571.02; 364/148; 364/154; 364/163; 364/183; 318/561; 388/907; 388/907.5
[58] Field of Search .............................. 364/371.02, 148, 364/151–154, 350, 157–163, 165, 166, 176, 177, 183; 318/561, 636, 609, 610; 388/900, 902, 907, 907.5, 909, 923

[56] References Cited

U.S. PATENT DOCUMENTS

| | | | |
|---|---|---|---|
| 3,727,035 | 4/1973 | Pemberton | 364/151 |
| 4,006,346 | 2/1977 | Pemberton | 364/159 |
| 4,232,364 | 11/1980 | Bibbero | 364/152 |

(List continued on next page.)

FOREIGN PATENT DOCUMENTS

| | | |
|---|---|---|
| 0 037 565 | 5/1980 | European Pat. Off. . |
| 0 260 987 A2 | 3/1988 | European Pat. Off. . |
| 0 261 765 | 3/1988 | European Pat. Off. . |
| 0 445 940 A1 | 11/1991 | European Pat. Off. . |
| 2 600 789 | 12/1987 | France . |
| 56-57106 | 5/1981 | Japan . |
| 59-69807 | 4/1984 | Japan . |
| 62-280903 | 12/1987 | Japan . |
| 1-95301 | 4/1989 | Japan . |
| 1-304174 | 11/1989 | Japan . |
| 2-50701 | 2/1990 | Japan . |
| 2-297604 | 12/1990 | Japan . |
| 3-152601 | 6/1991 | Japan . |
| 3-235101 | 10/1991 | Japan . |
| 3-268102 | 11/1991 | Japan . |
| 4-34602 | 2/1992 | Japan . |
| 4-84201 | 3/1992 | Japan . |
| 4-102102 | 4/1992 | Japan . |
| 5-27804 | 2/1993 | Japan . |
| 6-35510 | 2/1994 | Japan . |
| 6-266408 | 9/1994 | Japan . |
| 7-31522 | 4/1995 | Japan . |
| 2019610 | 10/1979 | United Kingdom . |
| 2178612 | 2/1987 | United Kingdom . |

OTHER PUBLICATIONS

"PID Tuning: It's The Method, Not the Rules," D.W. St. Clair and P.S. Fruehauf, *INTECH Engineer's Notebook*, Dec. 1994, pp. 27–30.

"Tuning Process Controllers," T.B. Kinney, *Chemical Engineering*, Sep. 19, 1983, pp. 67–72.

"Internal Model Control. 4. PID Controller Design," D.E. Rivera, M. Morari, S. Skogestad, *Industrial & Engineering Chemistry Process Design and Development*, vol. 25, No. 1, Jan. 1986, pp. 252–265.

"Auto–Tuning," *Adaptive Control*, K.J. Astrom and B. Wittenmark, Published by Addiston–Wesley Publishing Company, copyright 1989, pp. 328–342.

(List continued on next page.)

*Primary Examiner*—Emanuel Todd Voeltz
*Assistant Examiner*—Hal D. Wachsman
*Attorney, Agent, or Firm*—Westman, Champlin & Kelly, P.A.

[57] ABSTRACT

A process controller controls an integrating-type process based on a measured process variable and a set point. The process controller includes an error generating circuit, a non-integrating control circuit and an adaptive bias circuit. The error generating circuit generates an error signal based on a difference between the set point and the measured process variable. The control circuit generates a control signal as a function of the error signal. The adaptive bias circuit adds a bias value to the control signal, the measured process variable or the set point. The bias value is selectively updated as a function of the error signal to force the error signal toward zero.

22 Claims, 5 Drawing Sheets

U.S. PATENT DOCUMENTS

| | | | |
|---|---|---|---|
| 4,441,151 | 4/1984 | Hayashibe | 364/157 |
| 4,563,734 | 1/1986 | Mori et al. | 364/157 |
| 4,602,326 | 7/1986 | Kraus | 364/158 |
| 4,646,226 | 2/1987 | Moon | 364/176 |
| 4,669,040 | 5/1987 | Pettit et al. | 364/162 |
| 4,852,053 | 7/1989 | Turrie | 364/151 |
| 4,855,674 | 8/1989 | Murate et al. | 364/157 |
| 4,855,897 | 8/1989 | Shinskey | 364/148 |
| 4,882,526 | 11/1989 | Iino et al. | 318/561 |
| 5,043,862 | 8/1991 | Takahashi et al. | 364/162 |
| 5,126,933 | 6/1992 | White, III | 364/148 |
| 5,153,807 | 10/1992 | Saito et al. | 364/165 |
| 5,170,341 | 12/1992 | Sklaroff | 364/162 |
| 5,184,122 | 2/1993 | Decious et al. | 340/870.16 |
| 5,278,478 | 1/1994 | Moody et al. | 318/560 |
| 5,298,845 | 3/1994 | DeBoer et al. | 318/609 |
| 5,319,539 | 6/1994 | Shinshey | 364/157 |
| 5,331,541 | 7/1994 | Ueda et al. | 364/162 |
| 5,333,114 | 7/1994 | Warrior et al. | 364/550 |
| 5,341,288 | 8/1994 | Shinskey et al. | 364/159 |
| 5,369,345 | 11/1994 | Phan et al. | 318/361 |
| 5,371,670 | 12/1994 | Lurie | 364/160 |
| 5,406,474 | 4/1995 | Hansen | 364/148 |
| 5,420,785 | 5/1995 | Shinshey | 364/157 |
| 5,485,400 | 1/1996 | Warrior et al. | 364/330 |
| 5,519,605 | 5/1996 | Cawlfield | 364/151 |

OTHER PUBLICATIONS

Advertising Brochure: "Excalibur 7000. The Cutting Edge of Technology." Robertshaw Tennessee, undated. (No Date).

Advertisement: "Excalibur 7000. The Cutting Edge of Technology." published in *Instrumentation & Control Systems*, Sep. 1995, vol. 68, No. 9.

"Autotuning," *Automatic Tuning of PID Controllers*, K.J. Astrom and T. Hagglund, published by Instrument Society of America, Copyright 1988, pp. 105–110 (No Date with Month).

"Design of PID Controllers," *Automatic Tuning of PID Controllers*, K.J. Astrom and T. Hagglund, published by Instrument Society of America, Copyright 1988, pp. 51–61 (No Date with Month).

PROCESS CONTROLLER HAVING NON-INTEGRATING CONTROL FUNCTION AND ADAPTIVE BIAS

This is a continuation of application Ser. No. 08/532,488, filed Sep. 22, 1995, now abandoned.

BACKGROUND OF THE INVENTION

The present invention relates to an industrial process controller with adaptive bias, which can be implemented in low power and memory applications, such as in field mounted control units.

Field mounted control units include various devices, such as transmitters, actuators, transducers, switches and stand-alone controllers. Field mounted control units are used in process control systems to control the process, measure process variables and to generate outputs representative of the process variables for communication to central controllers or field control elements (e.g. values) over process control loops. The loops have included two-wire, three-wire and four-wire process control loops. Other loops have also been used, such as optical and radio frequency control loops.

Field mounted control units are mounted in a field area where current and voltage levels are typically limited to provide intrinsic safety. The units are often powered over the control loop. A separate transducer senses each process variable and provides the sensed variable to a transmitter for transmission to the central controller. Controllers can be located in a central control room or in the field and monitor the transducer outputs to generate appropriate control output signals. Control output signals are typically sent over a separate control loop to remote actuators, such as valves, which control the process according to the control output signals. In certain applications, controllers select the most appropriate set of instructions for process control equipment.

In one application, the transmitter itself includes a control function which provides the control output signals to the remote devices directly, thereby bypassing the central controller. A control function can also be located in the other field control elements, such as valves. This type of control unit is referred to as a field mounted control unit and is disclosed in more detail in Warrior et al., U.S. Pat. No. 5,333,114, which is hereby incorporated by reference.

The control algorithm or equation performed by the controller in the transmitter or in the central control room is specially tailored to the process in which the controller is used. Several basic control algorithms exist, including Proportional (P), Proportional-Integral (PI) Proportional-Derivative (PD) and Proportional-Integral-Derivative (PID) control algorithms. The performance of the control algorithm is determined by control parameters, such as $K_P$, $T_I$ and $T_D$ which correspond to the proportional gain, integral time and derivative time, respectively, for an ideal-type of PID control algorithm. In some applications, $K_P$ is replaced with a proportional band parameter PB, which is a function of $K_P$. Other types of PID control algorithms exist, such as parallel and serial equations. These algorithms have corresponding parameters which are similar to the ideal-type parameters. The control parameters are tuned based on a model of the underlying process to operate the process optimally.

SUMMARY OF THE INVENTION

A process controller controls an integrating-type process, such as a level process or flow control with a pulse duration output, based on a measured process variable and a set point. The process controller includes an error generating circuit, a non-integrating control circuit and an adaptive bias circuit. The error generating circuit generates an error signal based on a difference between the set point and the measured process variable. The control circuit generates a first control signal as a function of the error signal. The adaptive bias circuit adds a bias value to the control signal, the measured process variable or the set point. The bias value is selectively updated as a function of the error signal to force the error signal toward zero.

In one embodiment, the bias value is added to the first control signal to generate a second control signal which is used to control the process. The bias value is selectively updated to equal a steady state level of the second control signal when the error signal exceeds a selected maximum error band. The updated bias value forces the error signal toward a predefined error band such that the measured process variable closely tracks the set point.

In another embodiment, the bias value is added in the error generation circuit such that the error signal is the sum of the measured process variable, the set point and the bias value. The bias value is selectively updated to equal this error signal at a steady state when the difference between the set point and the process variable is outside the predefined error band.

The adaptive bias circuit provides a tracking feature in the controller without the use of an integration term. This eliminates undesirable limit cycling caused by a double integration which occurs when an integration term is used with an integrating-type process.

DETAILED DESCRIPTION OF THE PREFERRED EMBODIMENTS

The present invention is an adaptive bias process control system which is computationally simple such that the system can be implemented in a low-power field-mounted control unit in a process control system. The control system performs a closed loop, non-integrating control function over the process through a control output signal as a function of predefined control parameters. An adaptive bias circuit adds a bias value to the control output signal which is updated when a difference between the measured process variable and a user defined set point exceeds a maximum error tolerance band.

Figure 1:
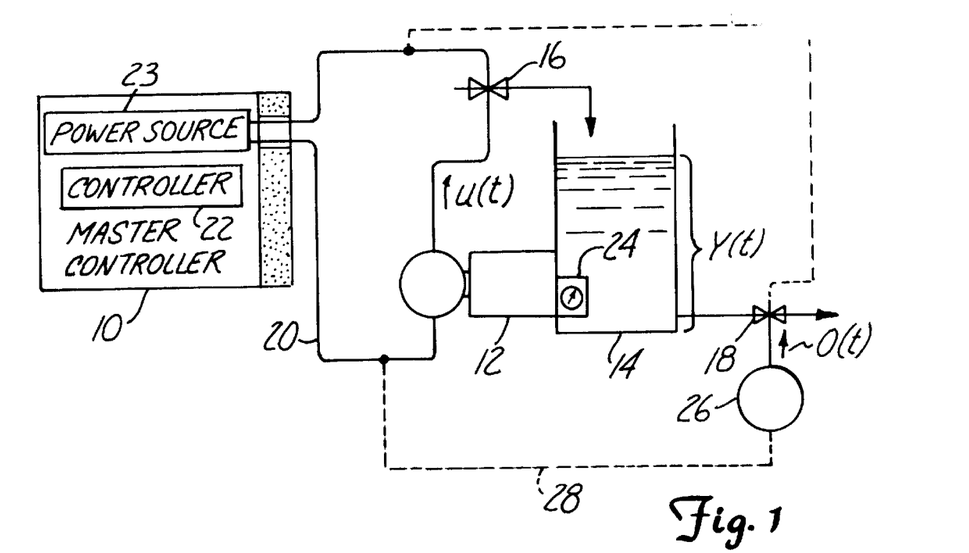
FIG. 1 is a diagram of a level control system according to one embodiment of the present invention.

FIG. 1 is a diagram of one embodiment in which the process control system of the present invention is useful. The process control system includes master controller 10, transmitter 12, tank 14, input valve 16 and output valve 18. Master controller 10 is coupled to transmitter 12 and input valve 16 through two-wire process control loop 20. Loop 20 can include a 4–20 mA or a 10–50 mA current loop, for example, which allows master controller 10, transmitter 12 and valve 16 to communicate with one another by varying the current level through the loop. In an alternative embodiment, master controller 10, transmitter 12 and valve 16 communicate by varying the voltage level on loop 20. Concurrently, master controller 10 and transmitter 12 communicate digitally over loop 20 in a carrier modulated fashion, such as in the HART® protocol.

Other digital communication systems can be used, including a Fieldbus Standard which is presently being adopted by the Fieldbus Foundation and a MODBUS Standard. Alternatively, loop 20 carries baseband modulated digital signals such as DE protocol. In addition, master controller 10 and transmitter 12 can communicate with one another optically over single or dual optical fibers or by radio frequency. An example of an optical control circuit is disclosed in U.S. Pat. No. 5,258,868, which is hereby incorporated by reference.

Master controller 10 includes a controller 22 and a power source 23 which provide power and control to loop 20. Master controller 10 can be positioned in a central control room or in a remote, field location with transmitter 12. Master controller 10, transmitter 12 and valve 16 can be coupled to one another in a variety of configurations as discussed in more detail in Warrior et al., U.S. Pat. No. 5,333,114.

In the embodiment shown in FIG. 1, the magnitude of current flowing through loop 12 represents a control output u(t) which controls flow into tank 14 by controlling the position of valve 16. Transmitter 12 preferably includes its own control function which is capable of taking over the operation of loop 20 from master controller 10 and sinking a variable amount of current to adjust control output u(t). The position of valve 18 controls the flow out of tank 14. Valve 18 is adjusted by a valve control signal o(t) which is provided by a transmitter 26 over a two-wire process control loop 28 which can be coupled to loop 20 in parallel (as shown in phantom) with loop 20 in a cascade fashion. The parallel configuration is referred to as is a multidrop configuration. The valve control signal o(t) can also be provided by a separate loop which is coupled to transmitter 12 or master controller 10.

A sensor 24 is coupled to tank 14 for measuring a level y(t) of fluid in the tank. The rate-of-change in level dy(t)/dt is a function of the positions of valves 16 and 18. The process in this example is a "direct action" process since an increase in u(t) causes an increase in y(t). In a "reverse action" process, an increase in u(t) would cause a decrease in y(t). Sensor 24 can include any suitable sensor, such as an absolute or differential pressure sensor, an ultrasonic sensor or a microwave sensor. Other types of sensors capable of generating a signal representative of the level of fluid in tank 14 can also be used.

The level control system shown in FIG. 1 is one example of a non-self-regulating process. The present invention can also be used with other non-self-regulating processes, such as a flow control with a pulse duration output. A non-self-regulating process is a process in which the measured process variable y(t) will continue to increase or decrease as long as the control signal u(t) is not equal to a steady state value $U_{SS}$ (i.e., when the inlet and outlet flows are not equal in a level process). The mass balance equation of the level process shown in FIG. 1 can be written as:

$$\frac{dy(t)}{dt} = m_1 u(t-L) - m_2 o(t) \quad \text{Eq. 1}$$

The above equation assumes that valves 16 and 18 are linear and neglects a head pressure effect on the valves. L is the overall process dead time, t is time and $m_1$ and $m_2$ are constants corresponding to the volume flow into and out of tank 14 divided by the area of tank 14. By assuming o(t) is constant, the following general equation for a direct acting integral-type process can be derived from Equation 1:

$$\frac{dy(t)}{dt} = m_1(u(t-L) - U_{SS}) \quad \text{Eq. 2}$$

where $U_{SS}$ is a steady state value of control output u(t).

Figure 2:
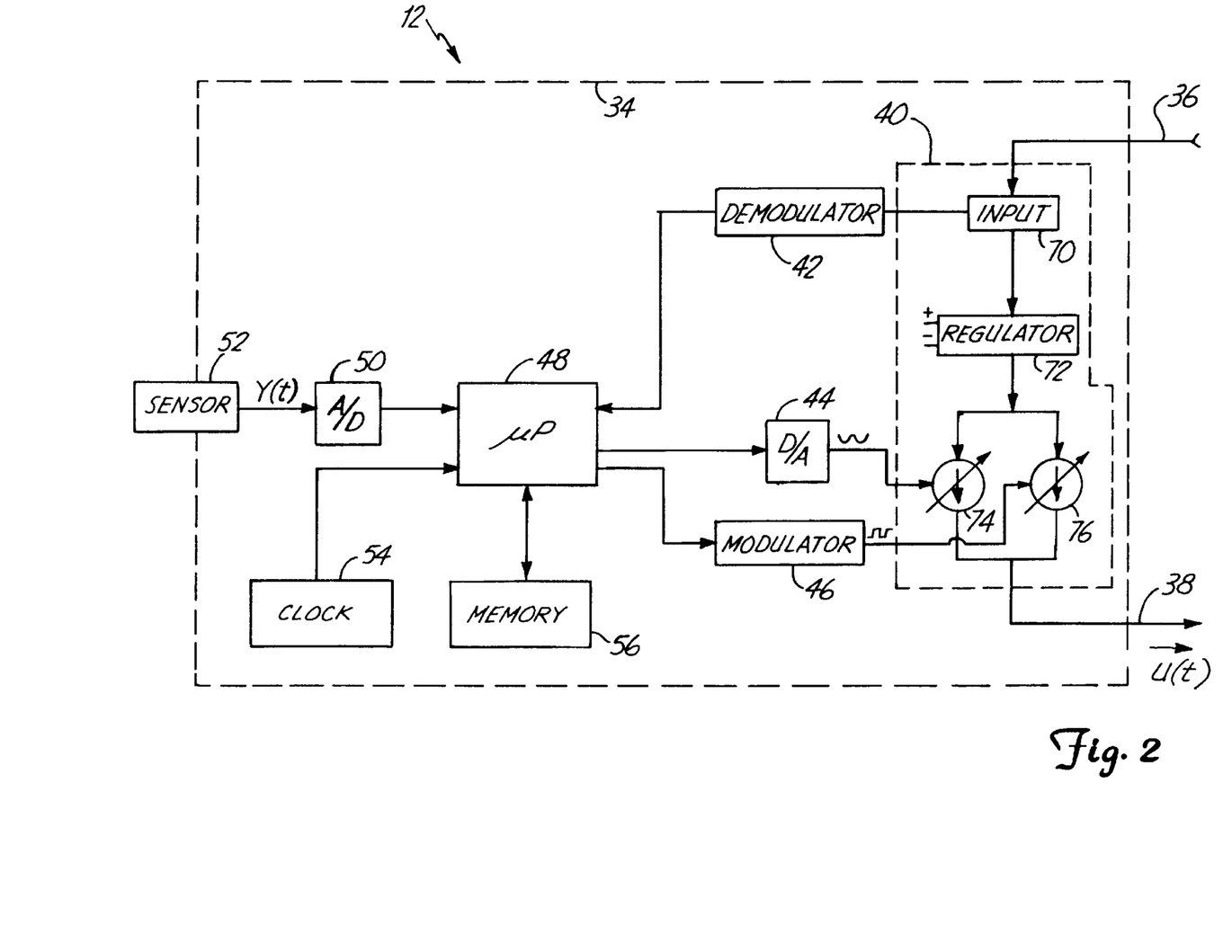
FIG. 2 is a block diagram of a transmitter shown in FIG. 1, which includes an adaptive bias controller according to the present invention.

FIG. 2 is a block diagram of transmitter 12 according to a first preferred embodiment of the present invention. Transmitter 12 includes a rugged, explosion proof housing 34 for mounting in the field, input terminal 36, output terminal 38, input-output circuit 40, demodulator 42, digital-to-analog (D/A) converter 44, modulator 46, microprocessor 48, analog-to-digital (A/D) converter 50, process variable sensor 52, clock circuit 54 and memory 56. Clock circuit 54 is connected to microprocessor 48 to sequence the operation of the microprocessor.

Input terminal 36 is coupled to master controller 10 (shown in FIG. 1) while output terminal 38 is coupled to valve 16 (also shown in FIG. 1). Input-output circuit 40 is coupled between input terminal 36 and output terminal 38. Circuit 40 includes input filter circuit 70, voltage regulator 72, current sink 74 and current sink 76 which are connected in series with one another in loop 20. Input-output circuit 40 receives process signals from loop 20 at input terminal 36 and supplies control output signals u(t) at output terminal 38 as a function of the process signals. Voltage regulator 72 within input-output circuit 40 receives power from loop 20 and provides a regulated voltage for powering all the various elements of transmitter 12.

The process signals used in generating control output u(t) comprise set points representative of a desired process state, process variables produced by the process, commands and whole or partial instruction sets for operating microprocessor 48, coefficients of terms for controlling microprocessor 48 and status requests from master controller 10. Input filter circuit 70 receives the process signals and directs the signals to demodulator 42. Demodulator 42 demodulates modulated process signals from the current loop and provides corresponding digital information to microprocessor 48. The information can be stored in memory 56 if desired.

Microprocessor 48 also receives process signals from process variable sensor 52. Sensor 52 measures a process variable y(t) and provides the measurement to A/D converter 50 which digitizes the measurement for microprocessor 48. The process variable measurements can then be stored in memory 56 for analysis or transmitted back to master controller 10 over loop 20. Microprocessor 48 transmits digital information to master controller 10 through modulator 46 and current sink 76, which modulate the information onto loop 20. In an alternative embodiment, sensor 52 and A/D converter 50 are located external to transmitter 12. In this embodiment, the process variable measured by sensor 52 is communicated to microprocessor 48 over loop 20 along with other process variables from different sensors.

Current sink 74 adjusts control output u(t) by adjusting the level of current flowing through loop 20. Microprocessor 48 operates current sink 74 through D/A converter 44 based on a control algorithm or software routine stored in memory 56 and as a function of the measured process variable y(t), stored control parameters and instructions received from master controller 10. For example, master controller 10 may provide a set point $Y_{SET}$ or other command to microprocessor 48 which instructs the microprocessor to adjust control output u(t) such that the process variable y(t) approaches the set point $Y_{SET}$.

Memory 56 may also include an auto-tuning algorithm or software routine which tunes the stored control parameters used by the control algorithm to achieve a desired control performance. The auto-tuning algorithm causes microprocessor 48 to adjust control output u(t) over time and observe a response in the process variable y(t). From this response, microprocessor 48 estimates model parameters, such as an estimated steady state control output value $U_{EST}$, the system dead time L and the constant $m_1$, and use the model parameters to calculate the desired control parameters for the control function. Although any tuning circuit or method can be used with the present invention, examples of suitable tuning circuits and methods can be found in a co-pending U.S. application Ser. No. 08/515,410, U.S. Pat. No. 5,691,896 of Zou et al., entitled "Field Based Process Control Unit With Auto-Tuning," and filed on Aug. 15, 1995, which is hereby incorporated by reference.

Several well-known control functions are available, such as P, PI, PD and PID control functions. The basic control equation for a PID controller in an ideal form is, $$u(t) = K_P e(t) + \frac{K_P}{T_I} \int e(t)dt + K_P T_D \frac{de(t)}{dt} \quad \text{Eq. 3}$$

where $K_P$, $T_I$ and $T_D$ are control parameters representing the proportional gain, integral time and derivative time, respectively.

In some applications, such as integrating processes, P or PD control functions may be preferred over PI and PID control functions. With an integrating process, the closed loop control performance of PI and PID control functions may experience undesirable limit cycling in the presence of valve hysteresis and friction due to double integration since the process acts as a natural integrator. Limit cycling occurs as the process variable oscillates about the set point, which causes the control signal and thus the control valve also to oscillate in an opposite direction to counteract oscillations in the process variable. There is no stable state in the process variable or the control signal. This compromises process quality, causes increased valve wear and affects upstream and downstream process. Although tuning the control parameters $K_P$, $T_I$ and $T_D$ can temporarily compensate for hysteresis and friction in a valve for a level control application, limit cycling may reappear with changes caused by valve packing friction, for example.

The present invention reduces limit cycling by replacing the integration term in Equation 3 with a reset or bias value $U_{RS}$, as shown in the following equation, $$u(t) = K_P e(t) + K_P T_D \frac{de(t)}{dt} + U_{RS} \quad \text{Eq. 4}$$

Bias value $U_{RS}$ is adaptively updated during normal closed loop control to minimize a tracking error introduced by a lack of integration.

Figure 3:
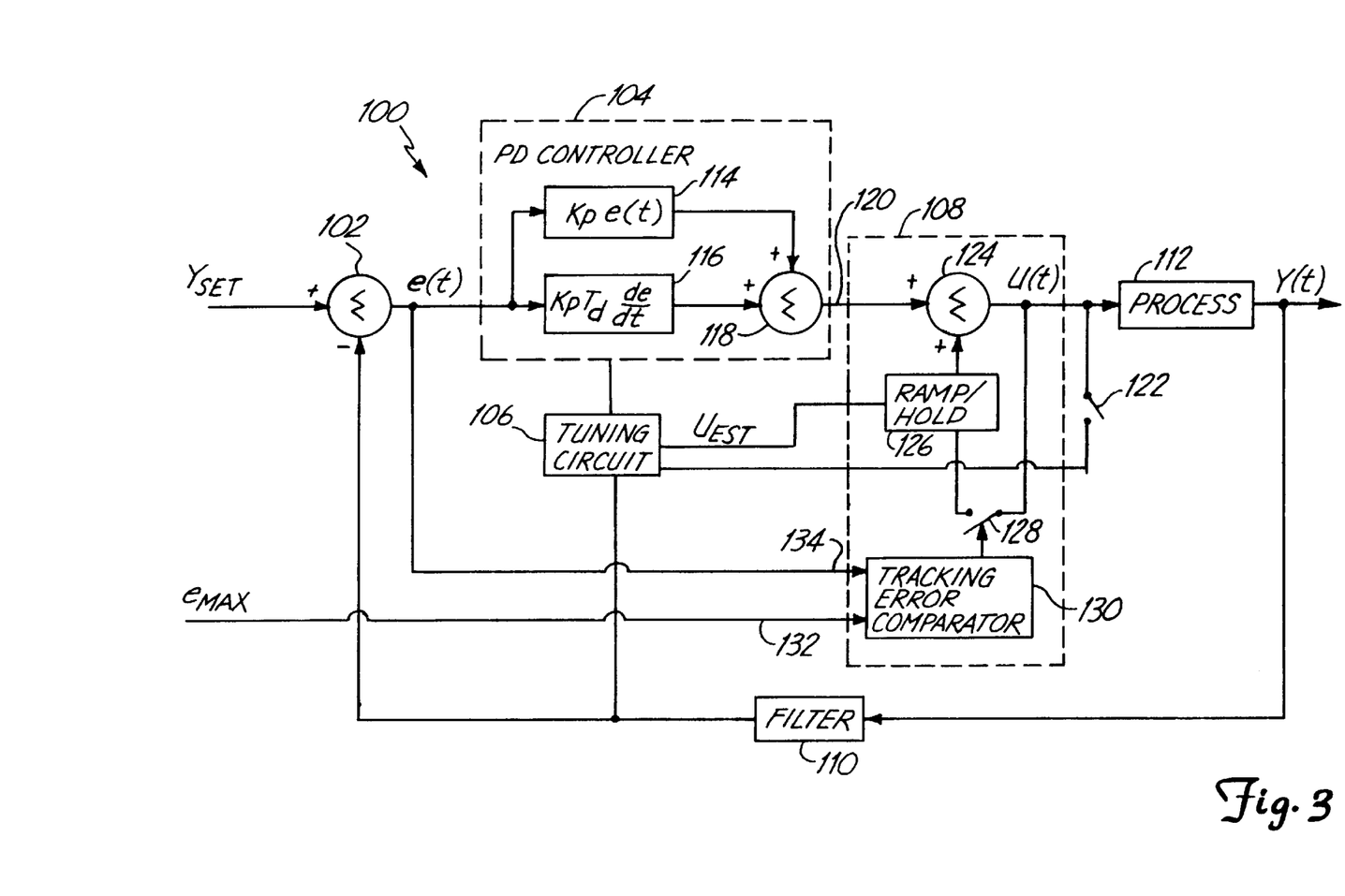
FIG. 3 is a diagram of the adaptive bias controller.

FIG. 3 is an illustration of an adaptive bias process control system according to one embodiment of the present invention. The control and tuning algorithms stored in memory 56 configure microprocessor 48 as a process control system. Control system 100 includes summing junction 102, PD controller 104, tuning circuit 106, adaptive bias circuit 108, and filter 110, which are coupled to process 112. In one embodiment, the functions of these elements are performed by microprocessor 48 (shown in FIG. 2). Although a PD type controller is shown in FIG. 1, the present invention is also useful with a P type controller or a P(D) type controller where the D term is zero.

For a "direct action" process, a process variable set point $Y_{SET}$ is provided to a positive input of summing junction 102 and the measured process variable y(t) is provided to a negative input of summing junction 102, through filter 110. For a "reverse action" process (not shown), $Y_{SET}$ is provided to the negative input of summing junction 102 and y(t) is provided to the positive input of summing junction 102.

The output of summing junction 102 generates an error signal e(t) which represents a difference between the set point $Y_{SET}$ and the measured process variable y(t). Error signal e(t) is provided to PD controller 104. PD controller 104 includes proportional gain control block 114, derivative block 116 and summing junction 118. The outputs of blocks 114 and 116 are provided to positive inputs of summing junction 118. Summing junction 118 generates a first control output signal on output 120 that is combined with a bias value $U_{RS}$ to generate a second control output signal u(t) which controls process 112.

In one embodiment, the control parameters $K_P$ and $T_D$ of blocks 114 and 116 may be tuned, or modified by tuning circuit 106 to match the characteristics of process 112 and to obtain a desired control performance. Tuning circuit 106 provides an open loop excitation signal, which varies over time, to process 112 through switching junction 122. The excitation signal provided by tuning circuit 106 is used as the second control output signal u(t) for disturbing process 112 during an auto-tuning stage. Switching junction 122 can be an actual switch or can be a transfer of control from one algorithm or software routine to the next. Tuning circuit 106 then observes the response in the measured process variable y(t) through filter 110 and generates a model of process 112.

As disclosed in the co-pending Zou et al. application, the process model parameters $U_{EST}$, $m_1$ and L may be estimated from the response in y(t) as:

$$U_{EST} = \frac{R_R U_{MIN} + R_F U_{MAX}}{R_R + R_F} \quad \text{Eqs. 5-7}$$

$$m_1 = \frac{R_R}{U_{MAX} - U_{EST}} = \frac{R_F}{U_{EST} - U_{MIN}} = \frac{R_R + R_F}{U_{MAX} - U_{MIN}}$$

$$L = \max(L_R, L_F)$$

where $R_R$ and $R_F$ are the rising and falling rates of change in the measured process variable y(t), $L_R$ and $L_F$ are the rising and falling system dead times, and $U_{MAX}$ and $U_{MIN}$ are sequential maximum and minimum control signal disturbances applied to process 112 through switching junction 122. The process model parameters are then used to tune the control parameters $K_P$ and $T_D$. Equations 5–7 are easily modified to estimate a process in which the process is reverse acting by exchanging $U_{MAX}$ and $U_{MIN}$. Other process model estimation equations can also be used with the present invention. Once the model has been estimated, any suitable set of tuning rules can be used to tune the parameters, such as internal model-based control (IMC) and Lambda tuning rules. The process model and tuned control parameters are then stored in memory 56 (FIG. 2) and can be provided to master controller 10 over process control loop 36.

Adaptive bias control circuit 108 is coupled between P or PD controller 104 and process 112. Circuit 108 includes summing junction 124, ramp and hold circuit 126, switching junction 128 and tracking error comparator circuit 130. Summing junction 124 has one positive input coupled to the output of summing junction 118 and another positive input coupled to ramp and hold circuit 126. Summing junction 124 generates the second control output signal u(t) which is the sum of the first control output signal 120 of PD controller 104 and bias reset value $U_{RS}$ provided by ramp and hold circuit 126. Control output signal u(t) is fed back to ramp and hold circuit 126 through switching junction 128. Tracking error comparator circuit 130 controls the state of switching junction 128 as a function of a comparison of a maximum tracking error $e_{MAX}$ provided at input 132 and the tracking error signal e(t) provided at input 134. The value of $e_{MAX}$ may be selected by the user and can be provided by master controller 10 (FIG. 1) over loop 20 for storage in memory 56 (FIG. 2).

Summing Junction 124 represents the addition of bias reset value $U_{RS}$ in Equation 4. Since the differential equation defined by Equations 2 and 4 has a solution at the stable state, $y(t)=Y_{SS}$, $u(t)=U_{SS}$, $e(t)=e_{SS}$ and de(t)/dt=0. Therefore, $$e_{SS} = \frac{U_{SS} - U_{RS}}{K_P} \quad \text{Eq. 8}$$

The tracking error is inversely proportional to $K_P$, and directly proportional to the difference $U_{SS}-U_{RS}$. If the bias reset value $U_{RS}$ is selected so that $U_{RS}=U_{SS}$, the stable state tracking error $e(t)=e_{SS}$ will approach zero.

Figure 4:
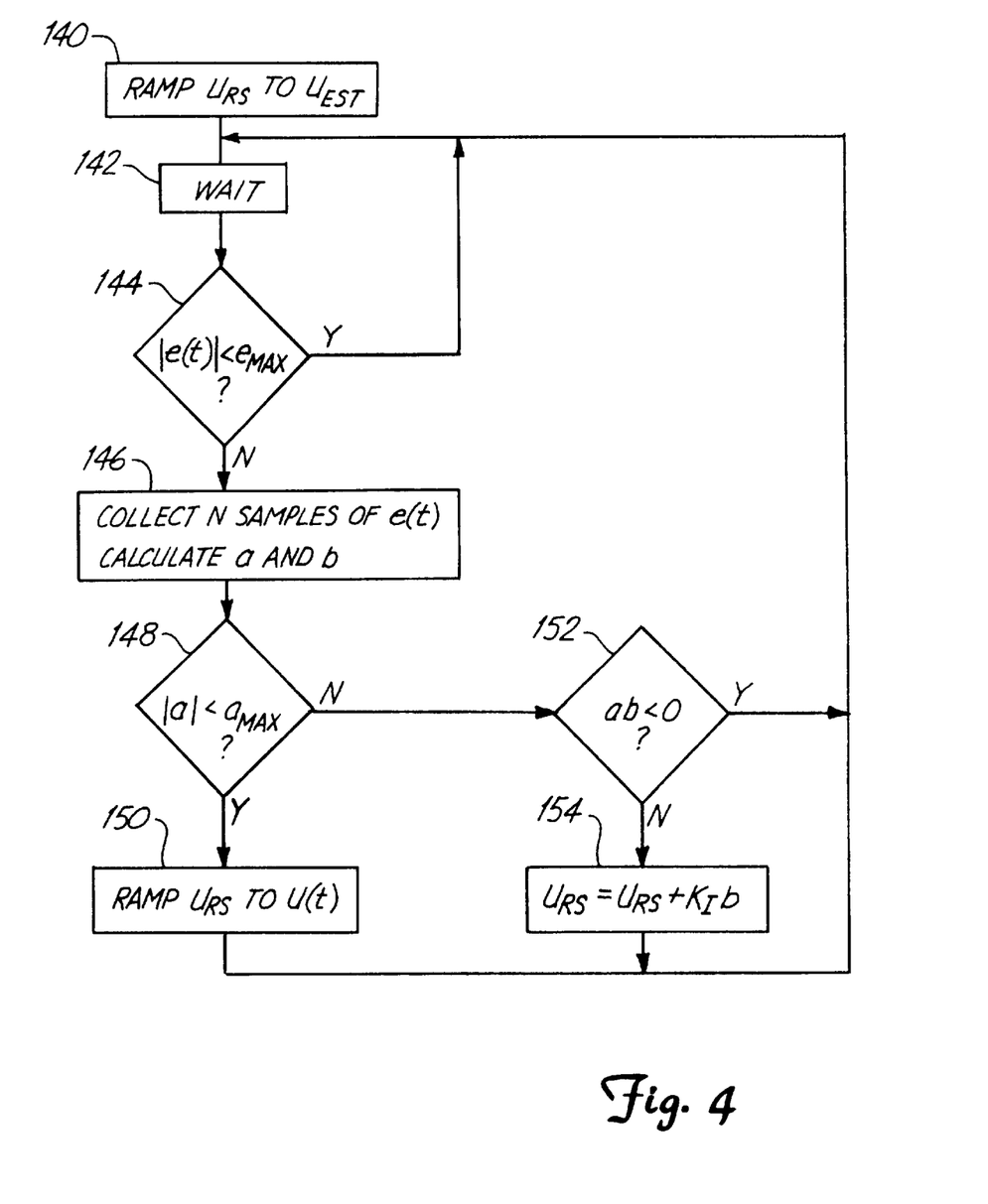
FIG. 4 is flow chart which illustrates a procedure for updating a bias value in the adaptive bias controller.

Given Equation 8, tracking error comparator circuit 130 operates switching junction 128 according to the flow chart shown in FIG. 4. When process control system 100 begins closed loop control of process 112, switching junction 122 opens. The process model has been estimated and the control function parameters have been calculated. At step 140, tuning circuit 106 provides the estimated steady state control output value $U_{EST}$ to ramp and hold circuit 126 which ramps $U_{RS}$ to $U_{EST}$ for initializing the control output u(t). The estimated value $U_{EST}$ may be somewhat different from the real $U_{SS}$. Consequently, PD controller 104 receives a tracking error e(t) from summing junction 102. At step 142, tracking error comparator circuit 130 waits a user-defined time period to allow y(t) and e(t) to approach a stable state. The time period may be any period such as several seconds or minutes.

After waiting the selected time period, tracking error comparator 130 begins observing samples of error e(t) and compares the samples with the maximum tracking error value $e_{MAX}$, at step 144. If |e(t)| is less than $e_{MAX}$, no action is necessary and tracking error comparator circuit 130 leaves switching junction 128 open such that bias value $U_{RS}$ is not updated. If |e(t)| is greater than $e_{MAX}$, then tracking error comparator circuit 130 verifies whether the process is stable.

There are several ways in which tracking error comparator circuit 130 can verify whether the process is stable. In one embodiment, N samples of error e(t) are collected, at step 146, which are fit into a curve an+b with a least square data fitting method where a is the slope, n is the sample and b is the intercept. Specifically, $$a \cdot 1 + b = e(1)$$

$$a \cdot 2 + b = e(2)$$

$$a \cdot N + b = e(N) \quad \text{Eq. 9}$$

The above equation can be written in the following matrix form, $$\begin{bmatrix} 1 & 1 \\ 2 & 1 \\ \cdots & \cdots \\ N & 1 \end{bmatrix} \begin{bmatrix} a \\ b \end{bmatrix} = \begin{bmatrix} e(1) \\ e(2) \\ \cdots \\ e(N) \end{bmatrix} \quad \text{Eq. 10}$$

This equation is solved according to the least square data fitting method by modifying the equation by the following matrix, $$\begin{bmatrix} 1 & 2 & \cdots & N \\ 1 & 1 & \cdots & 1 \end{bmatrix} \quad \text{Eq. 11}$$

which results in $$\begin{bmatrix} \Sigma n^2 & \Sigma n \\ \Sigma n & \Sigma 1 \end{bmatrix} \begin{bmatrix} a \\ b \end{bmatrix} = \begin{bmatrix} \Sigma n e(n) \\ \Sigma e(N) \end{bmatrix} \quad \text{Eq. 12}$$

By inverting the left matrix and reorganizing the equation, the equation becomes:

$$\begin{bmatrix} a \\ b \end{bmatrix} = \frac{12}{N(N^2-1)} \begin{bmatrix} \Sigma n e(n) - \frac{1}{2}(N+1)\Sigma e(n) \\ -\frac{1}{2}(N+1)\Sigma n e(n) + \frac{1}{6}(N+1)(2N+1)\Sigma e(n) \end{bmatrix} \quad \text{Eq. 13}$$

The terms a and b are calculated, at step 146, according to the above equation. These terms can be calculated by simply calculating the terms $\Sigma e(n)$ and $\Sigma n e(n)$. Once a and b are determined, tracking error comparator circuit 146 determines whether the process is stable. If the slope |a| of the curve is less than a threshold value $a_{MAX}$, at step 148, the process is stable and is outside the allowed error band (determined at step 144). The threshold value $a_{MAX}$ may represent a specified change in level over a specified period of time, for example. The bias reset value $U_{RS}$ is updated, at step 150, to equal the present value of u(t) so that the stable state error function $e_{SS}$ will approach zero.

In some applications, such as averaging level process control, a sudden change or "bump" in the control signal u(t) will upset the upstream or downstream process. Therefore, a "bumpless" update of bias value $U_{RS}$ is often desired. This can be achieved with a linear or exponential ramp function to smooth the bias value and thus the control signal update. In one example, $$\text{new}U_{RS} = \text{old}U_{RS} + Rt \quad \text{if } 0 \leq t \leq T$$

$$\text{new}U_{RS} = U_{SS} \quad \text{if } t > T \quad \text{Eq. 14}$$

where, $$R = \frac{U_{SS} - \text{old}U_{RS}}{T} \quad \text{Eq. 15}$$

R is the rate of the ramp and T is the ramp period. In another example, $$\text{new}U_{RS} = U_{SS} + (\text{old}U_{RS} - U_{SS})\exp(-Rt) \quad \text{Eq. 16}$$

where R is the time constant of the exponential ramp function.

If the slope |a| of the curve is greater than the threshold value $a_{MAX}$, then tracking error comparator circuit 130 determines whether the product, ab, is less than zero, at step 152. If so, a>0 and b<0 or a<0 and b>0, which means that the error e(t) is approaching the error band. There is no need to take any action in this case and tracking error comparator circuit 130 returns to wait step 142.

If ab>0, the error e(t) is outside the allowed band and the process variable y(t) is moving away from the set point. In this situation, action is required to bring the process variable y(t) toward the set point to avoid possible limit cycling in the load (or demand) where there never exists a stable control state, such as when cascade tanks experience load limit cycling. At step 154, a small offset, $K_I b$, is added to bias value $U_{RS}$, where $K_I$ is a user-defined integral gain constant that is stored in memory 56. The offset brings the process variable y(t) back toward the set point. Tracking error comparator 130 then returns to wait step 142. This process is repeated periodically to adapt bias value $U_{RS}$ to load and disturbance changes.

Several other ways to determine whether the process is stable exist and can be used with the present invention. For example, a more simplified method involves collecting N samples of the error e(t) and determining whether the statistical variance of the samples is smaller than a threshold value. If so, then the process is stable. Since the process is stable, and the error is outside the error band, as determined at step 144, the bias value $U_{RS}$ is updated with a ramp transition to equal the present value of u(t).

Figure 5:
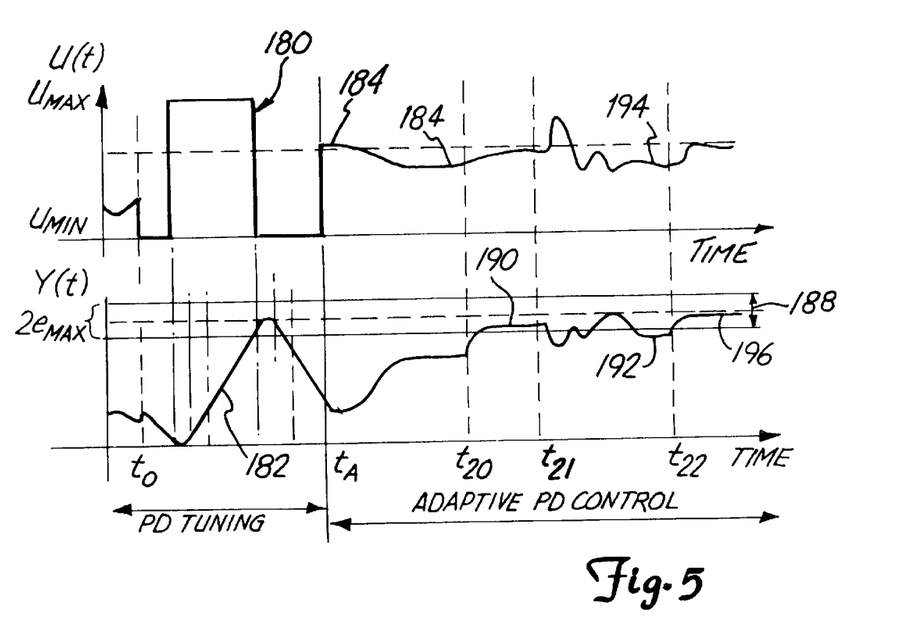
FIG. 5 is a waveform diagram illustrating an auto-tuning stage and a closed-loop adaptive bias control stage according to the present invention.

FIG. 5 is a waveform diagram which illustrates the adaptive bias operation. Waveform 180 represents the magnitude of the control output u(t) over time. Waveform 182 represents the magnitude of the process variable y(t) over time. From time $t_0$ to time $t_A$, tuning circuit 106 disturbs control output u(t), observes the measured process variable y(t), estimates the steady state control output $U_{EST}$ and other process model parameters and then tunes the control parameters $K_P$ and $T_D$, as discussed above. It should be understood that the tuning procedure and the tuning circuit 106 are optional with the present invention.

Adaptive tuning of bias value $U_{RS}$ begins at time $t_A$. At time $t_A$, tuning circuit 106 provides the estimated steady state control output $U_{EST}$ to ramp and hold circuit 126. PD controller 104 then begins controlling the process. As mentioned above, the estimated steady state control output $U_{EST}$, shown at 184, may be somewhat different than the real steady state control output $U_{SS}$, shown at 186.

At time $t_{20}$, the process variable y(t) reaches a stable state with a tracking error $e_{SS}$ greater than $e_{MAX}$. A tracking error band of $2e_{MAX}$ is shown at 188 along waveform 182. At time $t_{20}$, bias value $U_{RS}$ is updated to the real steady state control output $U_{SS}$ with a ramp function, shown at 186. The process variable y(t) then reaches a new stable state 190 which has a tracking error $e_{SS}$ that is less than $e_{MAX}$.

At time $t_{21}$, a disturbance or process load change occurs in process 112. PD controller 104 brings the process variable y(t) to a new stable state, at 192, by varying control output u(t). Since the stable state tracking error $e_{SS}$ at 192 is greater than $e_{MAX}$, tracking error comparator circuit 130 closes switch 128 and updates bias reset value $U_{RS}$ to equal the real control output steady state value $U_{SS}$ with a ramp function, shown at 194. Process variable y(t) reaches a new stable state, at 196, which has a tracking error $e_{SS}$ that is less than $e_{MAX}$.

In an alternative embodiment, the adaptive bias value is added to the measured process variable y(t) or the set point $Y_{SET}$ as opposed to the control output signal u(t). In this embodiment, the summing junction shown in FIG. 3 is removed and an error bias value $e_{BIAS}$ is added to summing junction 102. Equation 4 for PD control would therefore not include the term $U_{RS}$. The input of switch 128 is coupled to e(t), as opposed to u(t), to feed e(t) back to ramp and hold circuit 126. The output of ramp and hold circuit 126 provides $e_{BIAS}$ to summing junction 102. As a result summing junction 102 operates according to the following equation, $$e(t) = Y_{SET} - y(t) + e_{BIAS} \qquad \text{Eq. 17}$$

In this case, the control goal is to force $y(t)=Y_{SET}$, that is $e(t)=e_{BIAS}$. At the steady state, $e(t)=e_{SS}$, $y(t)=Y_{SS}$. If $e_{BIAS}$ is updated to equal $e_{SS}$, then $Y_{SS}$ is forced toward $Y_{SET}$ in the above equation for the same reasons as were discussed with reference to Equation 8. The error bias value $e_{BIAS}$ is updated in the same manner as the bias value $U_{RS}$ described above. It should be understood that the terms "add" and "sum" used herein includes adding positive or negative terms such that the addition may in fact be a subtraction.

Adaptive bias control eliminates the primary disadvantage of a lack of tracking ability in traditional P and PD control systems. The adaptive bias control of the present invention is simple, robust and adaptable for unexpected process disturbances and load changes. Since the adaptive bias control requires only simple calculations, it can be implemented in devices having limited power and memory, such as field mounted process control units. For example, a 4–20 mA current loop leaves only a few milliamps after the signal range is subtracted to power all of the electronic components in the unit. This limits the complexity of the components and the memory space that can be implemented in the unit. Typical memory transmitters available today are limited to 8K to 64K bytes, for example.

Figure 6:
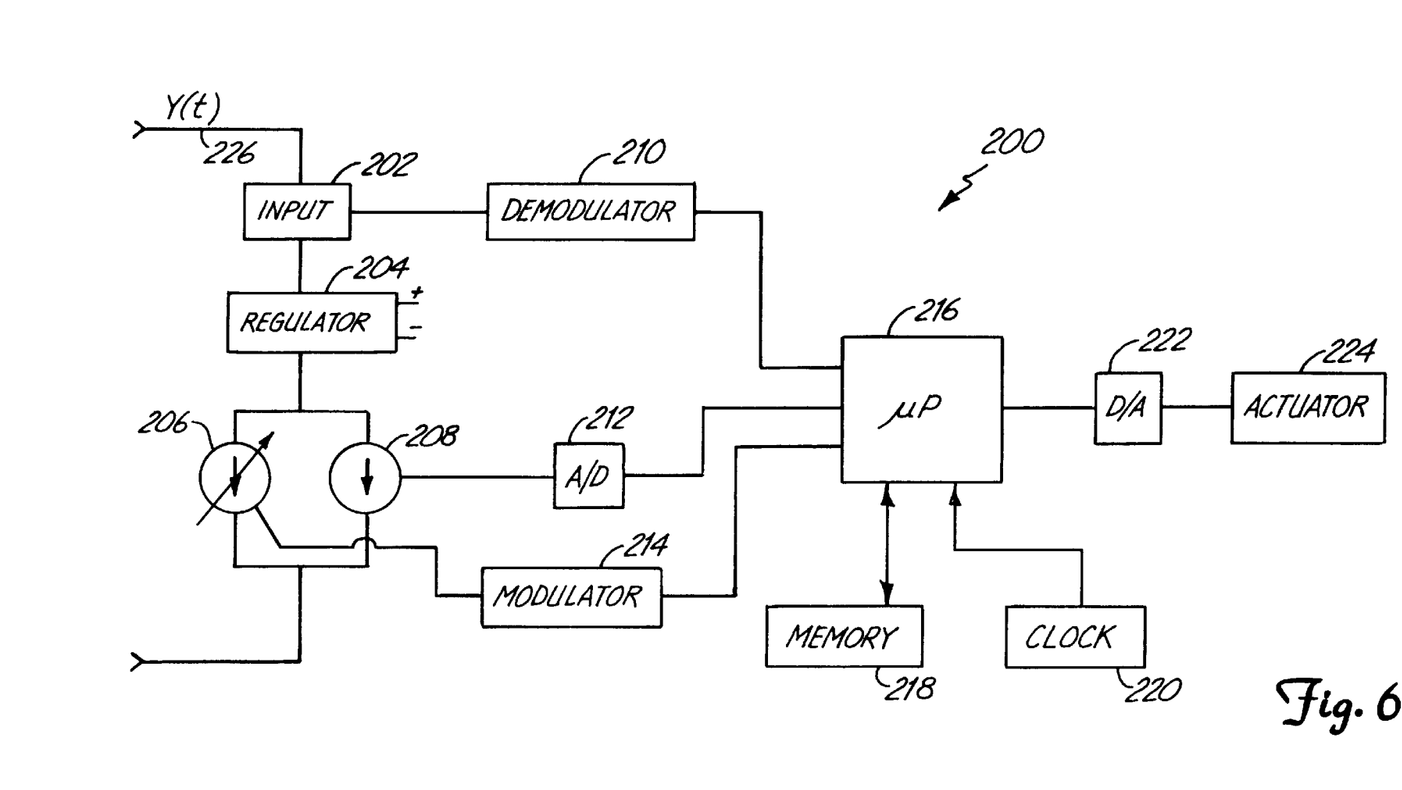
FIG. 6 is a block diagram of a valve having an adaptive bias control unit according to the present invention.

The adaptive bias control circuit of the present invention can also be implemented in a valve control unit, for example. FIG. 6 is similar to FIG. 2 and is a block diagram of a valve control unit 200 which includes input filter circuit 202, voltage regulator 204, adjustable current sink 206, current transducer 208, demodulator 210, A/D converter 212, modulator 214, microprocessor 216, memory 218, clock circuit 220, D/A converter 222 and actuator 224. Circuit 202, regulator 204, and current transducer 208 are connected in series with process control loop 226 for receiving the measured process variable y(t) and modulated digital data, such as a set point $Y_{SET}$, from the loop.

Demodulator 210 demodulates the data and provides the data to microprocessor 216 for analysis. Regulator 204 receives power from loop 226 and provides a regulated voltage for powering the elements of valve control unit 200. Current transducer 208 measures the analog current level y(t) in loop 226, which is converted by A/D converter 212 into digital data for microprocessor 216. Microprocessor 216 transmits data over loop 226 by modulating the current through sink 206 with modulator 214, such as by the HART® protocol. The auto-tuning algorithm, control algorithm, process model, tuning parameters and other user-defined constants are stored in memory 218 for configuring microprocessor 216 to control actuator 224 through D/A converter 222 as a function of the measured process variable y(t) and the set point $Y_{SET}$.

Although the present invention has been described with reference to preferred embodiments, workers skilled in the art will recognize that changes may be made in form and detail without departing from the spirit and scope of the invention. For example, the adaptive bias value can be added to the control output signal, the measured process variable or the set point value to move the tracking error e(t) toward zero. The adaptive bias control circuit can be implemented as a software routine or algorithm stored in memory for execution by a programmed computer, such as a microprocessor. In alternative embodiments, the circuit is implemented in digital or analog hardware. The control circuit can be located in the transmitter, in the valve or in master controller 10. Master controller 10 can be located in a central control room or at a remote location near the transmitter or valve. The control circuit can be used with any suitable tuning circuit or method, such as the well known Ziegler-Nichols' open-loop tuning method, the modified Ziegler-Nichols' frequency domain (closed loop) method, or the method disclosed in the copending application referred to above. Alternatively, the present invention can be used without a tuning circuit.

What is claimed is:

1. A process control apparatus for controlling an integrating-type process based on a measured process variable and a set point, comprising:

error means for generating an error signal as a function of a comparison between the set point and the measured process variable;

non-integrating control means coupled to the error means for generating a first control signal as a function of the error signal; and adaptive bias control means for adding a bias value to one of the first control signal, the measured process variable and the set point and for selectively updating the bias value as a function of the error signal.

2. The process control apparatus of claim 1 wherein the adaptive bias control means includes means for monitoring the error signal and for selectively updating the bias value when an absolute value of the error signal exceeds a selected maximum error.

3. The process control apparatus of claim 2 wherein the means for selectively updating includes means for selectively updating the bias value according to a ramp function.

4. The process control apparatus of claim 2 wherein the adaptive bias control means is coupled to the non-integrating control means and includes means for generating a second control signal based on a sum of the first control signal and the bias value and wherein the means for selectively updating updates the bias value to equal the second control signal.

5. The process control apparatus of claim 4 and further comprising:

estimating means coupled to the adaptive bias control means for estimating a steady state value of the second control signal based on the measured process variable; and wherein the adaptive bias control means comprises means for initializing the bias value to the estimated steady state value.

6. The process control apparatus of claim 2 wherein the adaptive bias control means is coupled to the error means and includes means for providing the bias signal to error means, wherein the error means generates the error signal based on a sum of the set point, the measured process variable and the bias value, and wherein the means for selectively updating updates the bias value to equal the error signal.

7. The process control apparatus of claim 1 wherein the adaptive bias control means comprises:

means for collecting N samples of the error signal and determining whether at least one of the N samples exceeds a selected maximum error;

means for fitting the N samples to a polynomial equation an+b, where a is the slope of the curve, b is the intercept and n is a variable representing the number of the sample which varies from 1 to N;

means for updating the bias value when at least one of the N samples exceeds the selected maximum error and the absolute value of slope a is less than a selected maximum slope.

8. The process control apparatus of claim 7 wherein the adaptive bias control means further comprises:

means for updating the bias value to equal a sum of the past bias value and a selected integral gain constant K, multiplied by intercept b when at least one of the N samples exceeds the selected maximum error, the absolute value of slope a is greater than a selected maximum slope and a product of slope a and intercept b is greater than zero.

9. The process control apparatus of claim 1 wherein the adaptive bias control means comprises:

means for collecting N samples of the error signal and determining whether at least one of the N samples exceeds a selected maximum error;

means determining a variance in the N samples and for updating the bias value when at least one of the N samples exceeds the selected maximum error and the variance is less than a selected maximum variance.

10. The process control apparatus of claim 1 wherein the non-integrating control means comprises a controller selected from the group consisting of proportional (P) and proportional-derivative (PD) controllers.

11. A process control apparatus for controlling an integrating-type process based on a measured process variable and a set point, comprising:

a first summing circuit having a process variable input for receiving the measured process variable, a set point input for receiving the set point, and an error output, wherein the fist summing circuit generates an error signal on the error output based on a difference between the process set point and the measured variable;

a non-integrating control circuit having an input coupled to the error output and having a first control output, wherein the control circuit generates a first control signal on the first control output in response to the error signal;

a second summing circuit having a control input, a bias input and a second control output, wherein the control input is coupled to the first control output and the second summing circuit generates a second control signal on the second control output based on a sum of the first control signal and a bias signal which is applied to the bias input;

a bias feedback circuit selectively coupled between the second control output and the bias input; and a bias control circuit coupled to the bias feedback circuit and the error output, which selectively couples the second control signal to the bias input based on the error signal.

12. A field-mounted control unit powered over a process control loop for controlling a process based on a measured process variable and a set point, comprising:

input-output means adapted to be coupled to the process control loop and for receiving power from the process control loop;

microprocessor means coupled to the input-output means and comprising:

error means having an input for receiving the measured process variable and the set point, wherein the error means generates an error signal as a function of a comparison between the measured process variable and the set point;

non-integrating control means coupled to the error means for generating a first control signal as a function of the error signal; and adaptive bias control means for adding a bias value to one of the first control signal, the measured process variable and the set point and for selectively updating the bias value as a function of the error signal; and a memory coupled to the microprocessor means.

13. The field-mounted control unit of claim 12 wherein the process control loop is selected from the group consisting of two-wire, three-wire and four-wire process control loops.

14. The field-mounted control unit of claim 12 wherein the process control loop is a two-wire process control loop and the input-output circuit is adapted to be coupled to and receive power from the two-wire process control loop.

15. A process control system for controlling a process based on a measured process variable and a set point, comprising:

a process control loop;

a controller comprising:
error means having an input for receiving the measured process variable and the set point, wherein the error means generates an error signal as a function of a comparison between the measured process variable and the set point;
non-integrating control means coupled to the error means for generating a control signal on the process control loop as a function of the error signal;
adaptive bias control means for adding a bias value to one of the control signal, the measured process variable and the set point; and
means for selectively updating the bias value as a function of the error signal; and a field device coupled to the process control loop which controls the process as a function of the control signal.

16. A method controlling a process as a function of a measured process variable and a set point, the method comprising:

generating an error signal as a function of the measured process variable and the set point;

generating a first control signal as a non-integrating function of the error signal;

adding a bias value to one of the first control signal, the measured process variable and the set point; and selectively updating the bias value as a function of the error signal.

17. The method of claim 16 wherein the step of selectively updating comprises updating the bias value when an absolute value of the error signal exceeds a selected maximum error.

18. The method of claim 16 wherein the step of selectively updating comprises updating the bias value according to a ramp function.

19. The method of claim 16 and further comprising:

generating a second control signal based on a sum of the first control signal and the bias value; and selectively updating the bias value to equal the second control signal.

20. The method of claim 16 wherein:

the step of generating the error signal comprises generating the error signal based on a sum of the measured process variable, the set point and the bias value; and the step of selectively updating comprises updating the bias value to equal the error signal.

21. A process control apparatus for controlling an integrating-type process based on a measured process variable and a set point, comprising:

non-integrating control means for generating a first control signal as a function of the measured process variable and the set point; and adaptive bias control means coupled to the non-integrating control means for generating a second control signal based on a sum of the first control signal and a bias value, wherein the adaptive bias control means provides the bias value as a function of the second control signal and a difference between the set point and the measured process variable.

22. A process control apparatus for controlling an integrating-type process based on a measured process variable and a set point, comprising:

error means for generating an error signal based on a sum of the measured process variable, the set point and a bias value;

non-integrating control means for generating a control signal as a function of the error signal; and adaptive bias control means coupled to the error means for providing the bias value to the error means and selectively updating the bias value to equal the error signal.

* * * * *

UNITED STATES PATENT AND TRADEMARK OFFICE
CERTIFICATE OF CORRECTION

PATENT NO. : 5,812,428
DATED : September 22, 1998
INVENTOR(S) : Hehong Zou and Coy L. Hays It is certified that error appears in the above-indentified patent and that said Letters Patent is hereby corrected as shown below:

Column 12, line 4, change "K," to --$K_1$--.

Signed and Sealed this

Second Day of March, 1999

Attest:

Q. TODD DICKINSON

*Attesting Officer*     Acting Commissioner of Patents and Trademarks